United States Patent
Kusano et al.

(10) Patent No.: US 8,283,395 B2
(45) Date of Patent: Oct. 9, 2012

(54) METHOD OF PRODUCING ORGANIC-PARTICLES-DISPERSION LIQUID

(75) Inventors: Takayuki Kusano, Kanagawa (JP); Yousuke Miyashita, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 82 days.

(21) Appl. No.: 11/919,982

(22) PCT Filed: May 8, 2006

(86) PCT No.: PCT/JP2006/309268
§ 371 (c)(1),
(2), (4) Date: Nov. 6, 2007

(87) PCT Pub. No.: WO2006/121016
PCT Pub. Date: Nov. 16, 2006

(65) Prior Publication Data
US 2009/0069473 A1    Mar. 12, 2009

(30) Foreign Application Priority Data

May 9, 2005  (JP) ................. 2005-136746
Jul. 22, 2005  (JP) ................. 2005-213501

(51) Int. Cl.
*C08K 5/3415* (2006.01)
*C08F 220/04* (2006.01)
*C08F 220/10* (2006.01)

(52) U.S. Cl. ............... 524/94; 524/599; 524/87; 524/92
(58) Field of Classification Search ................. 524/599, 524/87, 92, 94
See application file for complete search history.

(56) References Cited

U.S. PATENT DOCUMENTS

| | | |
|---|---|---|
| 1,600 A | 5/1840 | McGregor, Jr. |
| 32,250 A | 5/1861 | Jackson et al. |
| 1,351,352 A | 8/1920 | Stevens et al. |
| 1,592,713 A | 7/1926 | Bendixen |
| 1,692,617 A | 11/1928 | Bowen |
| 2,176,899 A | 10/1939 | Gordon et al. |
| 2,464,588 A | 3/1949 | Knudsen et al. |
| 2,642,419 A | 6/1953 | Waugh et al. |
| 2,984,462 A | 5/1961 | O'Connor |
| 3,018,091 A | 1/1962 | Duggins |
| 3,290,016 A | 12/1966 | Lennon et al. |
| 3,415,650 A | 12/1968 | Frame et al. |
| 3,443,748 A | 5/1969 | Hooper |
| 3,486,741 A | 12/1969 | Midgette |
| 3,529,936 A | 9/1970 | Muller-Rid et al. |
| 3,615,543 A | 10/1971 | Rosenoff |
| 3,638,917 A | 2/1972 | Osten |
| 3,709,828 A | 1/1973 | Marks |
| 3,845,938 A | 11/1974 | Schold |
| 3,893,811 A | 7/1975 | Good et al. |
| 4,289,733 A | 9/1981 | Saito et al. |
| 4,373,093 A | 2/1983 | Olson et al. |
| 4,391,648 A | 7/1983 | Ferrill, Jr. |
| 4,464,240 A | 8/1984 | Hansen |
| 4,621,928 A | 11/1986 | Schreiber |
| 4,666,669 A | 5/1987 | Mumaw |
| 4,898,998 A | 2/1990 | Kubo et al. |
| 5,294,728 A | 3/1994 | Emmons et al. |
| 5,837,041 A * | 11/1998 | Bean et al. ............. 106/31.6 |
| 5,854,323 A * | 12/1998 | Itabashi et al. ............ 524/88 |
| 5,882,114 A | 3/1999 | Fukuyo et al. |
| 5,961,213 A | 10/1999 | Tsuyuki et al. |
| 5,985,535 A | 11/1999 | Urabe |
| 6,000,840 A | 12/1999 | Paterson |
| 6,042,792 A | 3/2000 | Schefer et al. |
| 6,153,001 A | 11/2000 | Suzuki et al. |
| 6,245,832 B1 | 6/2001 | Suzuki et al. |
| 6,395,805 B1 | 5/2002 | Takao et al. |
| 6,410,619 B2 * | 6/2002 | Greene et al. ............ 524/88 |
| 6,422,736 B1 | 7/2002 | Antoniades et al. |
| 6,443,611 B1 | 9/2002 | Hasberg et al. |
| 6,572,227 B2 | 6/2003 | Yamashita et al. |
| 6,921,433 B2 * | 7/2005 | Kuribayashi et al. ....... 106/499 |
| 7,153,358 B2 * | 12/2006 | Weber et al. ............. 106/498 |
| 7,348,029 B2 | 3/2008 | Kliss et al. |
| 2002/0101783 A1 | 8/2002 | Hasberg et al. |
| 2002/0112644 A1 | 8/2002 | Nakamura et al. |
| 2002/0156154 A1 | 10/2002 | Ando et al. |
| 2003/0077536 A1 | 4/2003 | Yamashita et al. |

(Continued)

FOREIGN PATENT DOCUMENTS

EP    0824036 A1    2/1998

(Continued)

OTHER PUBLICATIONS

International Search Report dated Jul. 18, 2006 for International Application No. PCT/JP2006/309608.
Non-Final Office Action mailed Mar. 26, 2010 for copending U.S. Appl. No. 11/919,076.
Notice of Reasons for Rejection dated Dec. 13, 2011 for Japanese Application No. 2006-129714.
Notice of Reasons for Rejection dated Dec. 13, 2011 for Japanese Application No. 2006-533384.
Concise Explanation of Documents (JP-11-237760-A, WO-02/092700-A1, JP-6-79168-A and JP-2004-91560-A).
Concise Explanation of Documents (JP-6-79168-A, JP-2004-91560-A, JP-2000-239554-A, JP-2004-43776-A and JP-2004-123853-A).
International Search Report mailed Aug. 1, 2006 for PCT/JP2006/309269.

(Continued)

*Primary Examiner* — Satya Sastri
(74) *Attorney, Agent, or Firm* — Birch, Stewart, Kolasch & Birch, LLP

(57) ABSTRACT

A method of producing an organic particle dispersion, which has: dissolving an organic material into a good solvent to form a solution, mixing the solution with a poor solvent for the organic material in which the poor solvent is compatible with the good solvent, to form organic particles of the organic material in a mixed liquid, and thereby preparing a dispersion in which the organic particles are dispersed, in which a polymer compound having a weight average molecular weight of 1,000 or more is contained when preparing the dispersion.

13 Claims, No Drawings

U.S. PATENT DOCUMENTS

| | | |
|---|---|---|
| 2003/0152857 A1 | 8/2003 | Sugiura et al. |
| 2003/0198761 A1 | 10/2003 | Kaeding et al. |
| 2004/0027415 A1 | 2/2004 | Yamashita et al. |
| 2004/0055621 A1 | 3/2004 | McDermott et al. |
| 2004/0071958 A1 | 4/2004 | Marx et al. |
| 2004/0106057 A1 | 6/2004 | Tomita et al. |
| 2004/0121256 A1 | 6/2004 | Suzuki et al. |
| 2007/0012221 A1 | 1/2007 | Maeta et al. |
| 2009/0033844 A1 | 2/2009 | Ando et al. |
| 2009/0045535 A1* | 2/2009 | Miyashita et al. .................. 264/8 |
| 2009/0059138 A1* | 3/2009 | Matsumoto et al. .......... 349/106 |
| 2009/0069473 A1 | 3/2009 | Kusano et al. |
| 2009/0071373 A1* | 3/2009 | Izumi et al. ................... 106/493 |
| 2009/0071908 A1 | 3/2009 | Miyashita et al. |
| 2009/0101043 A1 | 4/2009 | Ogata et al. |

FOREIGN PATENT DOCUMENTS

| | | | |
|---|---|---|---|
| EP | 1541637 A1 | | 6/2005 |
| JP | 55-10545 B2 | | 3/1980 |
| JP | 1-115976 A | | 5/1989 |
| JP | 3-21339 A | | 1/1991 |
| JP | 3-161592 A | | 7/1991 |
| JP | 5-17133 A | | 1/1993 |
| JP | 5-214008 A | | 8/1993 |
| JP | 6-79168 A | | 3/1994 |
| JP | 06079168 A | * | 3/1994 |
| JP | 6-114259 A | | 4/1994 |
| JP | 7-138838 A | | 5/1995 |
| JP | 8-231210 A | | 9/1996 |
| JP | 9-77991 A | | 3/1997 |
| JP | 09077991 A | * | 3/1997 |
| JP | 10-43570 A | | 2/1998 |
| JP | 10-230158 A | | 9/1998 |
| JP | 11-237760 A | | 8/1999 |
| JP | 11-269432 A | | 10/1999 |
| JP | 2000-239554 A | | 9/2000 |
| JP | 2001-31900 A | | 2/2001 |
| JP | 2002-179976 A | | 6/2002 |
| JP | 2002-194244 A | | 7/2002 |
| JP | 2003-113341 A | | 4/2003 |
| JP | 2003-201419 A | | 7/2003 |
| JP | 2003-260347 A | | 9/2003 |
| JP | 2004-1471 A | | 1/2004 |
| JP | 2004-43776 A | | 2/2004 |
| JP | 2004-91560 A | | 3/2004 |
| JP | 2004091560 A | * | 3/2004 |
| JP | 2004-123853 A | | 4/2004 |
| JP | 2004-181312 A | | 7/2004 |
| JP | 2004-182751 A | | 7/2004 |
| JP | 2004-262941 A | | 9/2004 |
| JP | 2004-268019 A | | 9/2004 |
| JP | 2004-292632 A | | 10/2004 |
| JP | 2006-104448 A | | 4/2006 |
| JP | 2007-262378 A | | 10/2007 |
| WO | WO 02/092700 A1 | | 11/2002 |
| WO | WO 03/035035 A1 | | 5/2003 |
| WO | WO 03/054953 A1 | | 7/2003 |
| WO | WO 2004/029161 A1 | | 4/2004 |
| WO | WO 2006/121016 A1 | | 11/2006 |

OTHER PUBLICATIONS

International Search Report mailed Feb. 6, 2007 for PCT/JP2006/322306.

International Search Report mailed Jul. 18, 2006 for PCT/JP2006/309270.

International Search Report mailed Jul. 25, 2006 for PCT/JP2006/309268.

Office Action mailed Aug. 18, 2009 in copending U.S. Appl. No. 11/919,988.

Office Action mailed Aug. 3, 2009 in copending U.S. Appl. No. 11/920,082.

Office Action mailed Feb. 2, 2010 in copending U.S. Appl. No. 11/920,082.

Office Action mailed Mar. 19, 2009 in copending U.S. Appl. No. 11/919,988.

Office Action mailed Sep. 28, 2009 in corresponding Korean Application No. 2007-7028498.

* cited by examiner

METHOD OF PRODUCING ORGANIC-PARTICLES-DISPERSION LIQUID

TECHNICAL FIELD

The present invention relates to a method of producing an organic particle dispersion. Further, the present invention relates to a method of efficiently producing a dispersion comprising primary particles of organic pigment, by a reprecipitation process; in which the pigment particles are efficiently dispersed and made in a prescribed concentration. Furthermore, the present invention relates to a method of producing an organic particle dispersion containing an organic solvent.

BACKGROUND ART

In recent years, studies to reduce the size of particles have progressed. In particular, intensive study has been conducted to reduce the particles into nanometer size (for example, in the range of 10 to 100 nm) which can hardly be realized by methods of pulverization, precipitation, and others. Further, attempts have been made not only to provide particles of a nanometer order, but also to provide them with excellent monodispersity (the term "monodispersity" employed in the present specification refers to the degree of uniformity of size of particle diameters dispersed).

Such nanometer-sized fine particles are distinguished from bulk particles (bigger in size) and from molecules and atoms (smaller in size). That is, the nanometer-size fine particles are categorized in a new field between them stated above in size. Thus, such nanoparticles are considered to show unexpected new properties over the conventional sized particles. It is also possible to stabilize the properties of nanoparticles if the monodispersity can be improved. Thus, nanoparticles having such potential are attracting attention in various fields, and they have been studied vigorously in a variety of fields such as biochemistry, new materials, electronic elements, light-emitting display devices, printing, and medicine.

In particular, organic nanoparticles made of an organic compound involve great potential as a functional material, because the organic compounds, per se, can be modified diversely. For example, polyimide has been utilized in various fields because of, for example, the following reasons: polyimide is a chemically and mechanically stable material owing to, for example, its heat resistance, solvent resistance, and mechanical characteristics, and is excellent in electrical insulating property. A material obtained by turning polyimide into fine particles has been used in a wide variety of new applications by virtue of the combination of the properties and shape of polyimide. For example, as a technical proposal, polyimide having a fine-particle shape is proposed for use as an additive in a powder toner for image formation (see, for example, JP-A-11-237760 ("JP-A" means unexamined published Japanese patent application)).

In addition, among the organic nanoparticles, organic pigments are used in such applications as painting, a printing ink, an electrophotographic toner, an inkjet ink, and a color filter, and thus the organic pigments are now important materials essential for our everyday life. Particularly, organic pigments are demanded in high-performance with practical importance including pigments for an inkjet ink and a color filter.

Dyes have been used as the colorants for inkjet inks, but pigments are employed recently for solving problems of the dyes in water resistance and light resistance. Images obtained by using a pigment ink have an advantage that they are superior in light resistance and water resistance to the images formed by using a dye-based ink. However, it is difficult to give fine particles having excellent monodispersity and having nanometer size, so that the pigment particles can hardly penetrate into the pores on paper surface. As a result, such an image has a problem that the adhesiveness thereof to paper is weaker.

Further, the increase in the number of pixels of a digital camera, there is increased need for reduction in thickness of the color filter for use in optical elements such as a CCD sensor and a display device. Organic pigments have been used in color filters, of which thickness depends significantly on the particle diameter of the organic pigment, and hence it is needed to produce fine particles in a nanometer size, with having stability in a monodispersed state.

As for production methods of organic particles, studies are made on, for example, a gas-phase method (a method of sublimating a sample under inert gas atmosphere and depositing particles on a substrate), a liquid-phase method (a reprecipitation method for obtaining fine particles by injecting a sample dissolved in a good solvent into a poor solvent of which the agitating condition and the temperature are controlled), and a laser-ablation method (a method of reducing the size of particles by laser-ablation of a sample dispersed in a solution with laser). There are also reports on preparation of monodispersed nanoparticles having a desired particle size by these methods.

Of those, the liquid-phase method has been attracting attention because it is a method of producing organic particles excellent in its simplicity and productivity (see JP-A-6-79168, JP-A-2004-91560, and others).

The crystalline form and the nature of the surface of each of organic particles produced by the liquid-phase method can be controlled by adjusting conditions under which the particles are precipitated in accordance with, for example, the kind of solvent, the rate of injection, and temperature. JP-A-2004-91560 describes an example in which the crystalline form of a quinacridone pigment is adjusted in accordance with a poor solvent kind.

With regard to an improvement in dispersibility of particles, an organic pigment has been conventionally dispersed on an industrial scale by using various dispersing machines (such as a roll mill, a ball mill, and an attritor). In this case, however, a particle in the pigment is reduced in size, with the result that the viscosity of the pigment dispersion may increase. The increase in viscosity makes it difficult to take the pigment dispersion out of a dispersing machine, makes it impossible to transfer the pigment dispersion through a pipeline, and, furthermore, causes gelling of the dispersion during storage so that the pigment dispersion cannot be used. A dispersing agent that aids the dispersion, or a polymer that stabilizes the dispersion has been added for solving them, but it cannot attain a sufficient effect (see, for example, Pigment dispersion technique-surface treatment and how to use dispersing agent, and evaluation for dispersibility-(TECHNICAL INFORMATION INSTITUTE CO., LTD 1999)).

In an organic pigments dispersion for a color filter, in order to improve the dispersibility, a polymer or a pigmentary dispersing agent capable of imparting both alkali developability and dispersion stability needed for the production of a color filter is added (see, for example, JP-A-2000-239554). However, such methods have not satisfied the demand yet because of, for example, the following reasons: such methods require a long period of time for dispersing, and involves an increase in viscosity of the dispersion.

In addition, an example in which dispersibility is improved by using pigment particles prepared by the liquid-phase method has been reported. JP-A-2004-43776 describes an example in which pigment particles in a water dispersed state is prepared by the liquid-phase method. However, this method is a method of providing pigment particles in an aqueous dispersed state, and the document describes nothing about a method of providing pigment particles in an organic solvent dispersed state.

JP-A-2004-123853 describes an example in which pigment particles in an organic solvent dispersed state is provided by using pigment particles prepared by the liquid-phase method. JP-A-2004-123853 describes a method of precipitating the pigment by dissolving a pigment in a basic compound and/or a basic solution and adding a liquid of a neutral compound and/or a liquid of an acidic compound, or a neutral liquid and/or an acidic liquid. However, organic pigment particles obtained by the method have large primary particle diameters, and then the method has not sufficiently satisfied a demand for a reduction in particle size.

DISCLOSURE OF INVENTION

An object of the present invention is to provide a method of producing an organic particle dispersion. Further, an object of the present invention is to produce an organic particle dispersion by efficiently dispersing organic particles in a dispersion prepared by a reprecipitation process, or aggregated organic particles in a concentrated liquid prepared by concentrating the dispersion.

The objects of the present invention have been attained by the following means:
(1) A method of producing an organic particle dispersion, which comprises
  dissolving an organic material into a good solvent to form a solution,
  mixing the solution with a poor solvent for the organic material in which the poor solvent is compatible with the good solvent, to form organic particles of the organic material in a mixed liquid, and thereby
  preparing a dispersion in which the organic particles are dispersed,
  wherein a polymer compound having a weight average molecular weight of 1,000 or more is contained when preparing the dispersion.
(2) The method of producing an organic particle dispersion in the above item (1), further comprising a step of
  concentrating the mixed liquid in which the organic particles are formed.
(3) The method of producing an organic particle dispersion in the above item (1) or (2), wherein the organic particles have a number average particle diameter of 1 μm or less.
(4) The method of producing an organic particle dispersion in any one of the above items (1) to (3), wherein the polymer compound has an acidic group.
(5) The method of producing an organic particle dispersion in the above item (4), wherein the acidic group is a carboxyl group.
(6) The method of producing an organic particle dispersion in the above item (5), wherein the polymer compound having a carboxyl group is a copolymer containing; at least one repeating unit (A) derived from a compound having a carboxyl group; and at least one repeating unit (B) derived from a compound having a carboxylate group.
(7) The method of producing an organic particle dispersion in the above item (6), wherein the repeating unit (A) derived from a compound having a carboxyl group is a repeating unit represented by formula (1), and the repeating unit (B) derived from a compound having a carboxylate group is a repeating unit represented by formula (2);

[Chemical formula 1]

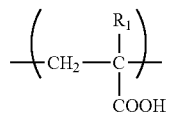

Formula (1)

wherein $R_1$ represents a hydrogen atom or an alkyl group having 1 to 5 carbon atoms;

[Chemical formula 2]

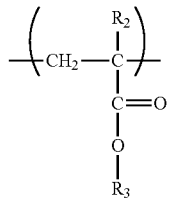

Formula (2)

wherein $R_2$ represents a hydrogen atom or an alkyl group having 1 to 5 carbon atoms, and $R_3$ represents a group represented by formula (3);

[Chemical formula 3]

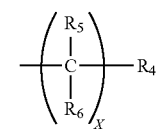

Formula (3)

wherein $R_4$ represents a hydrogen atom, an alkyl group having 1 to 5 carbon atoms, a hydroxy group, a hydroxyalkyl group having 1 to 5 carbon atoms, or an aryl group having 6 to 20 carbon atoms; $R_5$ and $R_6$ each represent a hydrogen atom or an alkyl group having 1 to 5 carbon atoms; and X represents an integer of 1 to 5.
(8) The method of producing an organic particle dispersion in the above item (7), wherein the repeating unit (A) derived from a compound having a carboxyl group is a repeating unit represented by formula (1), and the repeating unit (B) derived from a compound having a carboxylate group is a repeating unit represented by formula (4);

[Chemical formula 4]

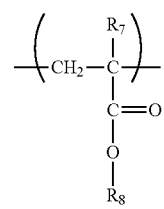

Formula (4)

wherein $R_7$ represents a hydrogen atom or an alkyl group having 1 to 5 carbon atoms, and $R_8$ represents a group represented by formula (5);

[Chemical formula 5]

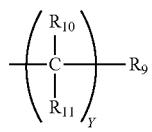

Formula (5)

wherein $R_9$ represents an alkyl group having 2 to 5 carbon atoms or an aryl group having 6 to 20 carbon atoms; $R_{10}$ and $R_{11}$ each represent a hydrogen atom or an alkyl group having 1 to 5 carbon atoms; and Y represents an integer of 1 to 5.

(9) The method of producing an organic particle dispersion in the above item (8), wherein the repeating unit (A) derived from a compound having a carboxyl group is a repeating unit derived from acrylic acid or methacrylic acid, and the repeating unit (B) derived from a compound having a carboxylate group is a repeating unit derived from a compound selected from the group consisting of benzyl acrylate, benzyl methacrylate, phenethyl acrylate, phenethyl methacrylate, 3-phenylpropyl acrylate, and 3-phenylpropyl methacrylate.

(10). The method of producing an organic particle dispersion in any one of the above items (1) to (9), wherein the poor solvent for the organic material is a solvent selected from the group consisting of an aqueous solvent, an alcohol compound solvent, a ketone compound solvent, an ether compound solvent, an ester compound solvent, and a mixture of these solvents.

(11) The method of producing an organic particle dispersion in any one of the above items (1) to (10), wherein the good solvent for the organic material is a solvent selected from the group consisting of an aqueous solvent, an alcohol compound solvent, a ketone compound solvent, an ether compound solvent, a sulfoxide compound solvent, an ester compound solvent, an amide compound solvent, and a mixture of these solvents.

(12) The method of producing an organic particle dispersion in any one of the above items (1) to (11), wherein the organic material is an organic pigment.

(13) The method of producing an organic particle dispersion in any one of the above items (1) to (12), which comprises, upon preparation of the organic particle dispersion, concentrating the mixed liquid in which the organic particles of the organic material are formed, and then adding said polymer compound therein.

(14) The method of producing an organic particle dispersion as described in any one of the above items (1) to (13), wherein the organic particle dispersion contains 60 mass % or more of an organic solvent.

Other and further features and advantages of the invention will appear more fully from the following description.

BEST MODE FOR CARRYING OUT THE INVENTION

Hereinafter, the method of producing an organic particle dispersion of the present invention will be described.
[Material to be Used as Organic Particles]

For an organic material to be used in the method of producing an organic particle dispersion of the present invention, there is no particular limitation as long as the organic material can be formed into particles by a reprecipitation method, and examples of the organic material include an organic pigment; an organic dye; fullerene; a polymer compound such as polydiacetylene or polyimide; or a particle composed of an aromatic hydrocarbon or an aliphatic hydrocarbon (such as an aromatic hydrocarbon or aliphatic hydrocarbon having orientation, or an aromatic hydrocarbon or aliphatic hydrocarbon having sublimation property). Of those, an organic pigment, an organic dye, or a polymer compound is preferable, and an organic pigment is particularly preferable. In addition, the organic particle may be used singly, two or more of them, or in combination of two or more.

The organic pigment is not limited in the color tone thereof. Specifically, examples thereof include a perylene, perynone, quinacridone, quinacridonequinone, anthraquinone, anthanthrone, benzimidazolone, condensed disazo, disazo, azo, indanthrone, phthalocyanine, triaryl carbonium, dioxazine, aminoanthraquinone, diketopyrrolopyrrole, thioindigo, isoindoline, isoindolinone, pyranthrone or isoviolanthrone-compound pigment, or a mixture thereof.

More specifically, examples of the organic pigment include perylene-compound pigments, such as C.I. Pigment Red 190 (C.I. No. 71140), C.I. Pigment Red 224 (C.I. No. 71127), C.I. Pigment Violet 29 (C.I. No. 71129), or the like; perynone-compound pigments, such as C.I. Pigment Orange 43 (C.I. No. 71105), C.I. Pigment Red 194 (C.I. No. 71100) or the like; quinacridone-compound pigments, such as C.I. Pigment Violet 19 (C.I. No. 73900), C.I. Pigment Violet 42, C.I. Pigment Red 122 (C.I. No. 73915), C.I. Pigment Red 192, C.I. Pigment Red 202 (C.I. No. 73907), C.I. Pigment Red 207 (C.I. Nos. 73900, 73906), C.I. Pigment Red 209 (C.I. No. 73905) or the like; quinacridonequinone-compound pigments, such as C.I. Pigment Red 206 (C.I. No. 73900/73920), C.I. Pigment Orange 48 (C.I. No. 73900/73920), C.I. Pigment Orange 49 (C.I. No. 73900/73920), or the like; anthraquinone-compound pigments, such as C.I. Pigment Yellow 147 (C.I. No. 60645) or the like; anthanthrone-compound pigments, such as C.I. Pigment Red 168 (C.I. No. 59300) or the like; benzimidazolone-compound pigments, such as C.I. Pigment Brown 25 (C.I. No. 12510), C.I. Pigment Violet 32 (C.I. No. 12517), C.I. Pigment Yellow 180 (C.I. No. 21290), C.I. Pigment Yellow 181 (C.I. No. 11777), C.I. Pigment Orange 62 (C.I. No. 11775), C.I. Pigment Red 185 (C.I. No. 12516), or the like; condensed disazo-compound pigments, such as C.I. Pigment Yellow 93 (C.I. No. 20710), C.I. Pigment Yellow 94 (C.I. No. 20038), C.I. Pigment Yellow 95 (C.I. No. 20034), C.I. Pigment Yellow 128 (C.I. No. 20037), C.I. Pigment Yellow 166 (C.I. No. 20035), C.I. Pigment Orange 34 (C.I. No. 21115), C.I. Pigment Orange 13 (C.I. No. 21110), C.I. Pigment Orange 31 (C.I. No. 20050), C.I. Pigment Red 144 (C.I. No. 20735), C.I. Pigment Red 166 (C.I. No. 20730), C.I. Pigment Red 220 (C.I. No. 20055), C.I. Pigment Red 221 (C.I. No. 20065), C.I. Pigment Red 242 (C.I. No. 20067), C.I. Pigment Red 248, C.I. Pigment Red 262, C.I. Pigment Brown 23 (C.I. No. 20060), or the like; disazo-compound pigments, such as C.I. Pigment Yellow 13 (C.I. No. 21100), C.I. Pigment Yellow 83 (C.I. No. 21108), C.I. Pigment Yellow 188 (C.I. No. 21094), or the like; azo-compound pigments, such as C.I. Pigment Red 187 (C.I. No. 12486), C.I. Pigment Red 170 (C.I. No. 12475), C.I. Pigment Yellow 74 (C.I. No. 11714), C.I. Pigment Yellow 150 (C.I. No. 48545), C.I. Pigment Red 48 (C.I. No. 15865), C.I. Pigment Red 53 (C.I. No. 15585), C.I. Pigment Orange 64 (C.I. No. 12760), C.I. Pigment Red 247 (C.I. No. 15915), or the like; indanthrone-compound pigments, such as C.I. Pigment Blue 60 (C.I. No. 69800), or the like; phthalocyanine-compound pigments, such as C.I. Pigment Green 7 (C.I. No. 74260), C.I. Pigment Green 36 (C.I. No. 74265), Pigment Green 37 (C.I. No. 74255), Pigment Blue 16 (C.I. No. 74100), C.I. Pigment Blue 75 (C.I. No. 74160:2), 15 (C.I. No. 74160), or the like; triaryl carbonium-compound pigments, such as C.I. Pigment Blue 56 (C.I. No. 42800), C.I. Pigment Blue 61 (C.I. No. 42765:1), or the like; dioxazine-compound pigments, such as C.I. Pigment Violet 23 (C.I. No. 51319), C.I. Pigment Violet 37 (C.I. No. 51345), or the like; aminoanthraquinone-compound pigments, such as C.I. Pigment Red 177 (C.I. No. 65300), or the like; diketopyrrolopyrrole-compound pigments, such as C.I. Pigment Red 254 (C.I. No. 56110), C.I. Pigment Red 255 (C.I. No. 561050), C.I. Pigment Red 264, C.I. Pigment Red 272 (C.I. No. 561150), C.I. Pigment Orange 71, C.I. Pigment Orange 73, or the like; thioindigo-compound pigments, such as C.I. Pigment Red 88 (C.I. No. 73312), or the like; isoindoline-compound pigments, such as C.I. Pigment Yellow 139 (C.I. No. 56298), C.I. Pigment Orange 66 (C.I. No. 48210), or the like; isoindolinone-compound pigments, such as C.I. Pigment Yellow 109 (C.I. No. 56284), C.I. Pigment Orange 61 (C.I. No. 11295), or the like; pyranthrone-compound pigments, such as C.I. Pigment Orange 40 (C.I. No. 59700), C.I. Pigment Red 216 (C.I. No. 59710), or the like; or isoviolanthrone-compound pigments, such as C.I. Pigment Violet 31 (C.I. No. 60010), or the like.

Preferred organic pigments are quinacridone-compound pigments, diketopyrrolopyrrole-compound pigments, phthalocyanine-compound pigments, or azo-compound pigments.

In the method of producing an organic particle dispersion of the present invention, a mixture of two or more organic pigments, a solid solution of organic pigments, or a combination thereof may also be used.

Examples of the organic dye that can be used as the organic material include an azo dye, a cyanine dye, a melocyanine dye, and a coumarin dye. Examples of the polymer compound that can be used as the organic material include polydiacetylene and polyimide.

[Production of Organic Particles]

Next, the method of producing organic particles will be described.

The organic particle according to the present invention is produced by a reprecipitation method involving mixing an organic material solution prepared by dissolving an organic material in a good solvent and a poor solvent for the organic material to obtain organic particles (hereinafter referred to as "reprecipitated organic particle liquid").

The poor solvent for the organic material will be described.

The poor solvent for the organic material is not particularly limited as long as the poor solvent is compatible or uniformly mixed with the good solvent for dissolving the organic material. With respect to the poor solvent for the organic material, the solubility of the organic material in the poor solvent is preferably 0.02 mass % or less, and more preferably 0.01 mass % or less. The solubility of the organic material in the poor solvent has no particular lower limit, but it is practical that the solubility is 0.000001 mass % or more in consideration of an organic material ordinarily used. The solubility may be solubility in the case where the organic material is dissolved in the presence of an acid or an alkali. In addition, compatibility or uniform mixing property between the good solvent and the poor solvent is such that the solubility of the good solvent in the poor solvent is preferably 30 mass % or more, and more preferably 50 mass % or more.

Examples of the poor solvents include aqueous solvents (e.g., water, aqueous hydrochloric acid solution, and aqueous sodium hydroxide solution), alcohol compound solvents, ketone compound solvents, ether compound solvents, aromatic compound solvents, carbon disulfide solvents, aliphatic compound solvents, nitrile compound solvents, halogen compound solvents, ester compound solvents, ionic solvents, and mixed solvents thereof. Preferable examples of the poor solvents include aqueous solvents, alcohol compound solvents, ketone compound solvents, ether compound solvents, ester compound solvents and mixed solvents thereof; and more preferable examples of the poor solvents include aqueous solvents, alcohol compound solvents and ester compound solvents.

Examples of the alcohol compound solvents include methanol, ethanol, isopropyl alcohol, n-propyl alcohol, 1-methoxy-2-propanol, and the like. Examples of the ketone compound solvents include acetone, methylethylketone, methylisobutylketone, cyclohexanone, and the like. Examples of ether compound solvents include dimethylether, diethylether, tetrahydrofuran and the like. Examples of the aromatic compound solvents include benzene, toluene, and the like. Examples of the aliphatic compound solvents include hexane, and the like. Examples of the nitrile compound solvents include acetonitrile, and the like. Examples of the halogen compound solvents include dichloromethane, trichloroethylene, and the like. Examples of the ester compound solvents include ethyl acetate, ethyl lactate, 2-(1-methoxy) propyl acetate, and the like. Examples of the ionic solvents include a salt of 1-butyl-3-methylimidazolium and $PF_6^-$, and the like.

Next, the good solvent for dissolving the organic material will be described.

The good solvent is not particularly limited as long as it can dissolve the organic material to be used, and is compatible or uniformly mixed with the poor solvent to be used at the time of the production of the organic particles. With respect to the solubility of the organic material in the good solvent, the solubility of the organic material is preferably 0.2 mass % or more, and more preferably 0.5 mass % or more. The solubility of the organic material in the good solvent has no particular upper limit, but it is practical that the solubility is 50 mass % or less in consideration of an organic material to be ordinarily used. The solubility may be solubility in the case where the organic material is dissolved in the presence of an acid or an alkali. A preferable range for compatibility or uniform mixing property between the poor solvent and the good solvent is as described above.

Examples of the good solvents include aqueous solvents (e.g., water, aqueous hydrochloric acid solution, and aqueous sodium hydroxide solution), alcohol compound solvents, amide compound solvents, ketone compound solvents, ether compound solvents, aromatic compound solvents, carbon disulfide solvents, aliphatic compound solvents, nitrile compound solvents, sulfoxide compound solvents, halogen compound solvents, ester compound solvents, ionic solvents, the mixed solvents thereof, and the like. Among these, aqueous solvents, alcohol compound solvents, ketone compound solvents, ether compound solvents, sulfoxide compound solvents, ester compound solvents, amide compound solvents, and the mixed solvents thereof are preferable; aqueous solvents, alcohol compound solvents, ester compound solvents, sulfoxide compound solvents, and amide compound solvents are more preferable; aqueous solvents, sulfoxide compound solvents, and amide compounds solvents are further preferable; and sulfoxide compound solvents and amide compounds solvents are particularly preferable.

Examples of the sulfoxide compound solvent include dimethyl sulfoxide, diethyl sulfoxide, hexamethylene sulfoxide, and sulfolane. Examples of the amide compound solvent include N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methylformamide, acetamide, N-methylacetamide, N,N-dimethylacetamide, N-methylpropaneamide, and hexamethylphosphoric triamide.

In addition, the concentration of the organic material solution prepared by dissolving the organic material in the good solvent is preferably in the range of the saturation concentration of the organic material with respect to the good solvent under a condition at the time of the dissolution to about one hundredth of the saturation concentration.

The condition under which the organic material solution is prepared is not particularly restricted, and can be selected from a range from a normal pressure condition to a subcritical or supercritical condition. The temperature at which the solution is prepared under normal pressure is preferably −10 to 150° C., more preferably −5 to 130° C., and particularly preferably 0 to 100° C.

In the present invention, the organic material must be uniformly dissolved in the good solvent and it is also preferable that the organic material be dissolved under an acidic or alkaline solvent. In general, in the case of the organic pigment having in the molecule thereof a group dissociative under alkaline, the alkaline solvent is used, and in the case of the organic pigment having no group dissociative under alkaline but having in the molecule thereof many nitrogen atoms, to which protons easily adhere, the acidic solvent is used. For example, quinacridone-, diketopyrrolopyrrole-, and condensed disazo-series pigments are dissolved in the alkaline solvent, and a phthalocyanine-series pigment is dissolved in the acidic solvent.

Examples of a base that can be used in the case that the organic material is dissolved in an alkaline solvent, include inorganic bases, such as lithium hydroxide, sodium hydroxide, potassium hydroxide, calcium hydroxide, and barium hydroxide; and organic bases, such as trialkylamine, diazabicycloundecene (DBU), and metal alkoxides. Among these, inorganic bases are preferable.

The amount of the base to be used is not particularly limited, as long as the base in the amount can make the organic material be dissolved homogeneously. In the case of the inorganic base, the amount thereof is preferably from 1.0 to 30 mole equivalents, more preferably from 1.0 to 25 mole equivalents, and further preferably from 1.0 to 20 mole equivalents, to the organic pigment. In the case of the organic base, the amount thereof is preferably from 1.0 to 100 mole equivalents, more preferably from 5.0 to 100 mole equivalents, and further preferably from 20 to 100 mole equivalents, to the organic material.

Examples of an acid to be used in the case that the organic material is dissolved in an acidic solvent, include inorganic acids, such as sulfuric acid, hydrochloric acid, and phosphoric acid; and organic acids, such as acetic acid, trifluoroacetic acid, oxalic acid, methanesulfonic acid, and trifluoromethanesulfonic acid. Among these, the inorganic acids are preferable, and sulfuric acid is especially preferable.

The amount of the acid to be used is not particularly limited, as long as the acid in the amount can make the organic material be dissolved homogeneously. In many cases, the acid is used in a larger or more excessive amount than the base. Regardless the kind of the acid being an inorganic acid or an organic acid, the amount of the acid to be used is preferably from 3 to 500 mole equivalents, more preferably from 10 to 500 mole equivalents, and further preferably from 30 to 200 mole equivalents, to the organic material.

When an alkali or an acid is mixed with the organic solvent so that the mixture is used as a good solvent for the organic material, a solvent having high solubility for the alkali or the acid such as water or a lower alcohol can be added in a slight amount to the organic solvent in order that the alkali or the acid may be completely dissolved. The amount of water or the lower alcohol is preferably 50 mass % or less, or more preferably 30 mass % or less with respect to the total amount of the organic material solution. Specific examples thereof that can be used include water, methanol, ethanol, n-propanol, isopropanol, and butyl alcohol.

A condition for the poor solvent at the time of the production of the organic particles, that is, upon precipitation and formation of the organic particles is not particularly limited, and can be selected from a range from a normal pressure condition to a subcritical or supercritical condition. The temperature at which the solvent is prepared under normal pressure is preferably −30 to 100° C., more preferably −10 to 60° C., and particularly preferably 0 to 30° C.

In case of mixing of the organic material solution and the poor solvent, the organic material solution is preferably added to the poor solvent. At that time, the poor solvent is more preferably in a stirred state. The stirring rate is preferably 100 to 10,000 rpm, more preferably 150 to 8,000 rpm, and particularly preferably 200 to 6,000 rpm. A pump or the like may be or may not be used for adding. As the adding method, addition to the stirred liquid or addition from outside the stirred liquid may be used; addition to the stirred liquid is preferable.

A mixing ratio of the organic material solution to the poor solvent (a ratio of the good solvent to the poor solvent in the reprecipitated organic particle liquid) is preferably 1/50 to 2/3, more preferably 1/40 to 1/2, and particularly preferably 1/20 to 3/8 in volume ratio.

The concentration of the reprecipitated organic particles solution is not particularly limited, as long as organic particles can be prepared, but the amount of the organic particles is preferably 10 to 40,000 mg, more preferably 20 to 30,000 mg, and particularly preferably 50 to 25,000 mg, per 1,000 ml of the dispersion solvent.

As to a particle diameter of the organic particles, an average scale of a group can be evaluated by several measurement methods. There are frequently-used parameters such as mode diameter indicating the maximum value of distribution, median diameter corresponding to the median value in the integral frequency distribution curve, and various average diameters (number-averaged diameter, length-averaged diameter, area-averaged diameter, weight-averaged diameter, volume-averaged diameter, or the like), and the like. In the present invention, the average particle diameter means a number-averaged diameter, unless otherwise particularly specified. The average particle diameter of the organic particles (primary particles) according to the present invention is preferably 500 µm or less, more preferably 100 µm or less, and particularly preferably 10 µm or less. Further, in case of preparing nano-meter-size particles, the average particle diameter is preferably 1 nm to 1 µm, more preferably 1 to 200 nm, further preferably 2 to 100 nm, and particularly preferably 5 to 80 nm.

Further, in the present invention, a ratio (Mv/Mn) of volume-averaged diameter (Mv) to number-averaged diameter (Mn) is used as the indicator of the degree of monodispersion of particles uniform in size, unless otherwise particularly specified. The ratio Mv/Mn of the particles (primary particles) contained in the organic particle dispersion that can be used in the method of concentrating organic particles is preferably 1.0 to 2.0, more preferably 1.0 to 1.8, and particularly preferably 1.0 to 1.5.

Examples of a method of measuring the particle diameter of the organic particle include a microscopic method, a gravimetric method, a light scattering method, a light shielding method, an electric resistance method, an acoustic method, and a dynamic light scattering method. Among these, the microscopic method and the dynamic light scattering method are particularly preferable. Examples of a microscope to be used in the microscopic method include a scanning electron microscope and a transmission electron microscope. Examples of a particle measuring device according to the dynamic light scattering method include Nanotrac UPA-EX 150 (trade name) manufactured by NIKKISO Co., Ltd., and a dynamic light scattering photometer DLS-7000 series (trade name) manufactured by OTSUKA ELECTRONICS CO., LTD.

[Concentration of Reprecipitated Organic Particle Liquid]

Next, the method of concentrating the reprecipitated organic particle liquid will be described.

The method of concentrating the reprecipitated organic particle liquid is not particularly limited. Examples of a preferable concentration method include: a method involving adding and mixing an extraction solvent to and with the reprecipitated organic particle liquid, concentrating and extracting the organic particles to the extraction solvent phase, and filtering the concentrated extract through a filter or the like, to provide a concentrated particle liquid; a method involving sedimenting the organic particles by centrifugal separation for concentration; and a method involving drying a solvent under heat or reduced pressure for concentration. Alternatively, for example, a combination of two or more of these methods is preferably employed. The concentration of an organic particle liquid after concentration (which is also referred to as "concentrated organic particle liquid") is preferably 1 to 100 mass %, more preferably 5 to 100 mass %, and particularly preferably 10 to 100 mass %.

When concentration and extraction are performed with an extraction solvent, the extraction solvent is not particularly limited, but it is preferably a solvent that is substantially incompatible (immiscible) with the dispersion solvent of the reprecipitated organic particle liquid (e.g., aqueous solvent) (In the present invention, the term "substantially incompatible" means that the compatibility is low, and the solvent is soluble preferably in an amount of 50 wt % or less, and more preferably 30 wt % or less. Although the amount of the extraction solvent to be dissolved in the dispersion solvent has no particular lower limit, it is practical that the amount is 1 mass % or more in consideration of the solubility of an ordinary solvent.), and that forms an interface after the extraction solvent is mixed with the dispersion solvent and left still. In addition, the extraction solvent is preferably a solvent that causes weak aggregation to such a degree that the organic particles can be redispersed in the extraction solvent. In the present invention, weak, redispersible aggregation means that aggregates can be redispersed without applying high shearing force such as by milling or high-speed agitation. Such a state is preferable, because it is possible to prevent strong aggregation that may change the particle size, and to swell the desirable organic particles with the extraction solvent, besides the dispersion solvent such as water can be easily and rapidly removed by filter-filtration.

As the extraction solvents, ester compound solvents, alcohol compound solvents, aromatic compound solvents, and aliphatic compound solvents are preferable; ester compound solvents, aromatic compound solvents, and aliphatic compound solvents are more preferable; ester compound solvents are particularly preferable.

Examples of the ester compound solvents include 2-(1-methoxy) propyl acetate, ethyl acetate, ethyl lactate, and the like. Examples of the alcohol compound solvents include n-butanol, isobutanol, and the like. Examples of the aromatic compound solvents include benzene, toluene, xylene, and the like. Examples of the aliphatic compound solvents include n-hexane, cyclohexane, and the like. The extraction solvent may be a pure solvent of one of the preferable solvents above, while it may be a mixed solvent of multiple solvents.

An amount of the extraction solvent is not particularly limited, as long as the solvent can extract the organic particles, but an amount of the extraction solvent is preferably smaller than an amount of the reprecipitated organic particle liquid, considering extraction for concentration. When expressed by volume ratio, an amount of the extraction solvent to be added is preferably in the range of 1 to 100, more preferably in the range of 10 to 90, and particularly preferably in the range of 20 to 80, with respect to 100 of the reprecipitated organic particle liquid. A too-large amount may results in elongation of the period for concentration, while a too-small amount may cause insufficient extraction and residual particles in the dispersion solvent.

After addition of the extraction solvent, it is preferably agitated well for sufficient mutual contact with the dispersion. Any conventional method may be used for agitation and mixing. A temperature during addition and mixing of the extraction solvent is not particularly limited, but preferably 1 to 100° C. and more preferably 5 to 60° C. Any apparatus may be used for addition and mixing of the extraction solvent as long as it can suitably carry out each step. For example, a separatory funnel-like apparatus may be used.

To separate a concentrated extraction liquid from a dispersion solvent of the reprecipitated organic particle liquid, filtration by using a filter is preferable. The apparatus for filter-filtration is, for example, a high-pressure filtration apparatus. Preferable filters include nanofilter, ultrafilter and the like. It is preferable to remove a residual dispersion solvent by filter filtralation, so as to further concentrate organic particles in the concentrated extraction liquid and to obtain a concentrated particle liquid.

According to the method of concentrating particles, it is possible to concentrate organic particles from the reprecipitated organic particle liquid efficiently. As for the concentration ratio, it is possible, for example, to raise the concentration of organic particles in an organic particle liquid after concentration preferably 100 to 1,000 times, and more preferably 500 to 1,000 times. In addition, according to the method, it is possible to realize a high extraction rate by almost eliminating residual organic particles in the residual dispersion solvent after extraction of the organic particles.

Hereinafter, centrifugal separation will be explained.

A centrifugal separator for use in the concentration of the organic particles by centrifugal separation may be an arbitrary device as long as the organic particles in the reprecipitated organic particle liquid (or in the concentrated organic particles extract liquid) can be sedimented. Examples of the centrifugal separator include a general-purpose device, a system having a skimming function (function with which a supernatant layer is sucked during the rotation of the system, to discharge to the outside of the system), and a continuous centrifugal separator for continuously discharging solid matter.

As the conditions for centrifugal separation, a centrifugal force (a value representing a ratio of an applied centrifugal acceleration to the gravitational acceleration) is preferably 50 to 10,000, more preferably 100 to 8,000, and particularly preferably 150 to 6,000. A temperature at the time of centrifugal separation is preferably −10 to 80° C., more preferably −5 to 70° C., and particularly preferably 0 to 60° C., though a preferable temperature varies depending on the kind of the solvent of the dispersion.

Hereinafter, drying will be described.

A device for use in the concentration of the organic particles by drying under reduced pressure is not particularly limited as long as the solvent of the reprecipitated organic particle liquid (or of the concentrated organic particles extract liquid) can be evaporated. Examples of the device include a general-purpose vacuum drier and a general-purpose rotary pump, a device capable of drying a liquid under heat and reduced pressure while stirring the liquid, and a device capable of continuously drying a liquid by passing the liquid through a tube the inside of which is heated and reduced in pressure.

A temperature for drying under heat and reduced pressure is preferably 30 to 230° C., more preferably 35 to 200° C., and particularly preferably 40 to 180° C. A pressure for the above-mentioned reduced pressure is preferably 100 to 100,000 Pa, more preferably 300 to 90,000 Pa, and particularly preferably 500 to 80,000 Pa.

[Dispersion of Concentrated Organic Particle Liquid (Production of Organic Particle Dispersion)]

According to the method of producing an organic particle dispersion of the present invention, it is possible to finely disperse the organic particles that are in an aggregation state by, for example, concentration (In the present invention, finely dispersing of particles means breaking aggregation of the particles in a dispersion and increasing a degree of dispersion).

The organic particles in an organic particle liquid concentrated by means of, for example, an solvent extraction method, centrifugal separation, or drying as described above, are normally being aggregated by concentration. In some cases, the particles are made aggregated state intentionally in order that prompt filter filtration may be performed.

Thus, dispersion by conventional dispersion methods is insufficient for conversion into fine particles, and a method showing higher efficiency for finely dispersing is required. Even with such aggregated organic particles (In the present invention, the term of aggregated organic particles means flocks of organic particles combined by a secondary force, such as aggregates), it is possible to finely disperse the organic particles because the polymer compound having a weight average molecular weight of 1,000 or more is contained in the organic particle dispersion, according to the method of producing an organic particle dispersion of the present invention.

Next, the polymer compound having a weight average molecular weight of 1,000 or more to be used in the method of producing an organic particle dispersion of the present invention (In the present invention, the term "polymer compound" means an organic compound having a weight average molecular weight of 1,000 or more. Although the weight average molecular weight has no particular upper limit, it is practical that the weight average molecular weight is 100,000 or less.) will be described in detail.

The polymer compound having a weight average molecular weight of 1,000 or more to be used in the method of producing an organic particle dispersion of the present invention is not particularly limited as long as the polymer compound has a weight average molecular weight of 1,000 or more, but the weight average molecular weight of 3,000 or more is preferable, and the weight average molecular weight of 5,000 or more is more preferable.

The polymer compound having a weight average molecular weight of 1,000 or more is preferably a compound having an acidic group, more preferably a compound having a carboxyl group, and particularly preferably a copolymerized compound containing at least one repeating unit (A) derived from a compound having a carboxyl group and at least one repeating unit (B) derived from a compound having a carboxylate group.

The repeating unit (A) derived from a compound having a carboxyl group is preferably a repeating unit represented by the following formula (1), and more preferably a repeating unit derived from acrylic acid or methacrylic acid, and the repeating unit (B) derived from a compound having a carboxylate group is preferably a repeating unit represented by the following formula (2), more preferably a repeating unit represented by the following formula (4), and particularly preferably a repeating unit derived from benzyl acrylate, benzyl methacrylate, phenethyl acrylate, phenethyl methacrylate, 3-phenylpropyl acrylate, or 3-phenylpropyl methacrylate.

[Chemical formula 6]

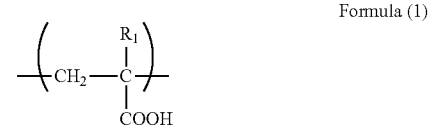

Formula (1)

(in which $R_1$ represents a hydrogen atom or an alkyl group having 1 to 5 carbon atoms.)

[Chemical formula 7]

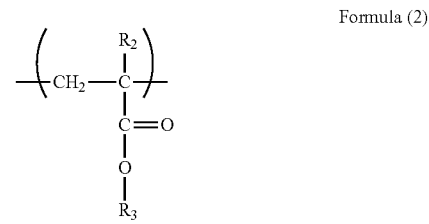

Formula (2)

(in which $R_2$ represents a hydrogen atom or an alkyl group having 1 to 5 carbon atoms, and $R_3$ represents a group represented by formula (3).)

[Chemical formula 8]

Formula (3)

(in which $R_4$ represents a hydrogen atom, an alkyl group having 1 to 5 carbon atoms, a hydroxy group, a hydroxyalkyl group having 1 to 5 carbon atoms, or an aryl group having 6 to 20 carbon atoms; $R_5$ and $R_6$ each represent a hydrogen atom or an alkyl group having 1 to 5 carbon atoms; and X represents an integer of 1 to 5.)

[Chemical formula 9]

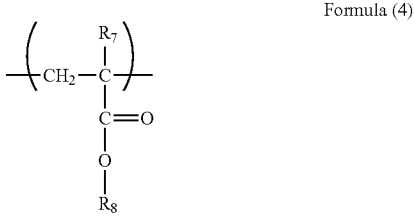

Formula (4)

(in which $R_7$ represents a hydrogen atom or an alkyl group having 1 to 5 carbon atoms, and $R_8$ represents a group represented by formula (5).)

[Chemical formula 10]

Formula (5)

(in which $R_9$ represents an alkyl group having 2 to 5 carbon atoms or an aryl group having 6 to 20 carbon atoms; $R_{10}$ and $R_{11}$ each represent a hydrogen atom or an alkyl group having 1 to 5 carbon atoms; and Y represents an integer of 1 to 5.)

As a polymerization ratio between the repeating unit (A) derived from a compound having a carboxyl group and the repeating unit (B) derived from a compound having a carboxylate group, a ratio (%) of the number of the repeating units (A) to the total number of repeating units is preferably 3 to 40, and more preferably 5 to 35.

In the present invention, the term "molecular weight" means a weight average molecular weight, unless otherwise stated. Examples of a method of measuring the molecular weight include a chromatography method, a viscosity method, a light scattering method, and a sedimentation velocity method. In the present invention, unless otherwise stated, a weight average molecular weight measured by the chromatography method is used.

The polymer compound having a weight average molecular weight of 1,000 or more may be either water-soluble or oil-soluble, or may be water-soluble and oil-soluble. The polymer compound having a weight average molecular weight of 1,000 or more may be added in a state of being dissolved in an aqueous solvent or an organic solvent, or may be added in a solid state. In addition, such addition methods may be combined. Examples of a method of adding the polymer compound in a state of being dissolved in a solvent include: a method involving adding, to an aggregated organic particle liquid, the polymer compound in a state of being dissolved in the same solvent as that of the aggregated organic particle liquid; and a method involving adding, to the aggregated organic particle liquid, the polymer compound in a state of being dissolved in a different solvent compatible with the solvent of the aggregated organic particle liquid (In the present invention, the term "aggregated organic particle liquid" means a liquid containing aggregated organic particles, and the liquid may be, for example, a dispersion, a concentrated liquid, a paste, or slurry as long as the liquid contains the aggregated organic particles).

When the polymer compound is added in a state of being dissolved in a solvent, the concentration of the polymer compound having a weight average molecular weight of 1,000 or more is not particularly limited, but the concentration is preferably 1 to 70 mass %, more preferably 2 to 65 mass %, and particularly preferably 3 to 60 mass %.

The polymer compound having a weight average molecular weight of 1,000 or more may be added at the time of the formation of organic particles by the reprecipitation method (or before or after the formation), may be added at the time of extraction or concentration (or before or after the extraction or the concentration), may be added at the time of the dispersion of aggregated organic particles after concentration (or before or after the dispersion), or may be added after the completion of these steps. Alternatively, the polymer compound may be added at two or more of the times in combination. The polymer compound is preferably added as a binder at the time of the dispersion of aggregated organic particles after concentration.

The polymer compound having a weight average molecular weight of 1,000 or more is added in an amount of preferably 0.1 to 1,000 parts by mass, more preferably 5 to 500 parts by mass, and particularly preferably 10 to 300 parts by mass when the amount of organic particle contained in aggregated organic particles is set to 100 parts by mass.

Examples of the polymer compound having a weight average molecular weight of 1,000 or more include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyamides, cellulose derivatives, and starch derivatives. Besides, natural polymers can be used, examples of which include alginic acid salts, gelatin, albumin, casein, gum arabic, tragacanth gum, and ligninsulfonic acid salts.

Examples of the polymer compound having an acidic group include polyvinyl sulfuric acid and concentrated naphthalenesulfonic acid.

Examples of the polymer compound having a carboxyl group include polyacrylic acid, polymethacrylic acid, and a cellulose derivative having a carboxyl group in any one of its side chains. Examples of the copolymer containing at least one repeating unit (A) derived from a compound having a carboxyl group and at least one repeating unit (B) derived from a compound having a carboxylate group; include a methacrylic acid copolymer, an acrylic acid copolymer, an itaconic acid copolymer, a crotonic acid copolymer, a maleic acid copolymer, and a partially-esterified maleic acid copolymer, as described in JP-A-59-44615, JP-B-54-34327, JP-B-58-12577, JP-B-54-25957, JP-B-59-53836 and JP-A-59-71048. In addition, particularly preferable examples of the copolymer include an acrylic acid-acrylate copolymer, a methacrylic acid-acrylate copolymer, an acrylic acid-methacrylate copolymer, a methacrylic acid-methacrylate copolymer, and a multiple copolymer containing acrylic acid or methacrylic acid, an acrylate or a methacrylate, and any other vinyl compound, as described in U.S. Pat. No. 4,139,391.

Examples of the vinyl compound include styrene or substituted styrene (such as vinyltoluene or vinyl ethyl benzene); vinylnaphthalene or substituted vinylnaphthalene; acrylamide; methacrylamide; acrylonitrile; and methacrylonitrile. Of those, styrene is preferable.

Those compounds may be used alone or in combination of two or more thereof, or may be used in combination with a compound having a molecular weight of less than 1,000.

In the method of producing an organic particle dispersion of the present invention, a stirring machine, a dispersing machine, an ultrasonic wave irradiation device, or the like, can also be preferably used. Examples of the shape of the stirring blade of the stirring machine include a turbine blade, a screw blade, a faudler blade, a dissolver blade, and a stirring portion constituted of a turbine portion capable of rotating and an immobilized stator portion placed around the turbine portion with a slight gap. Examples of the dispersing machine include a sand mill, a ball mill, an attritor, and a roll mill. Examples of the ultrasonic wave irradiation machine include an ultrasonic homogenizer and an ultrasonic cleaner. Among these, a dispersing machine and an ultrasonic wave irradiation device are preferable, and an ultrasonic wave irradiation device is more preferable.

In the method of producing an organic particle dispersion of the present invention, the amount of an organic solvent in the organic particle dispersion is preferably 60 mass % or more, and more preferably 65 mass % or more. The organic solvent is not particularly limited, and can be appropriately selected from common solvents. Examples of a preferable solvent include ester compound solvents, alcohol compound solvents, aromatic compound solvents, aliphatic compound solvents, and ketone compound solvents. Of those, ester compound solvents or ketone compound solvents are particularly preferable. Those solvents may be used alone or in combination of two or more thereof.

Examples of the ester compound solvents include 2-(1-methoxy) propyl acetate, ethyl acetate, ethyl lactate, and the like. Examples of the alcohol compound solvents include n-butanol, isobutanol, and the like. Examples of the aromatic compound solvents include benzene, toluene, xylene, and the like. Examples of the aliphatic compound solvents include n-hexane, cyclohexane, and the like. Examples of the ketone compound solvents include methylethylketone, acetone, cyclohexanone, and the like.

In the method of producing of an organic particle dispersion of the present invention, a pigmentary dispersing agent can also be preferably used. An anionic, cationic, amphoteric, nonionic, or pigmentary, low-molecular-weight or high-molecular-weight dispersant can be used as the pigmentary dispersing agent.

The pigmentary dispersing agent is defined as a dispersing agent derived from an organic pigment as a parent material, and prepared by chemically modifying a structure of the parent material. Examples of the pigmentary dispersing agent include sugar-containing pigmentary dispersing agents, piperidyl-containing pigmentary dispersing agents, naphthalene- or perylene-derivative pigmentary dispersing agents, pigmentary dispersing agents having a functional group linked through a methylene group to a pigment parent structure, pigmentary dispersing agents (parent structure) chemically modified with a polymer, pigmentary dispersing agents having a sulfonic acid group, pigmentary dispersing agents having a sulfonamido group, pigmentary dispersing agents having an ether group, and pigmentary dispersing agents having a carboxylic acid group, carboxylic acid ester group or carboxamido group.

A compound represented by formula (1) described in JP-A-2000-239554 is also preferably used.

The content of the dispersing agent is preferably from 0.1 to 1,000 parts by mass, more preferably from 1 to 500 parts by mass, and further preferably from 10 to 250 parts by mass, to 100 parts by mass of the pigment, to further improve the uniform dispersibility and storage stability of the pigment. If the content of the dispersing agent is less than 0.1 part by mass, the dispersion stability of the organic pigment fine particles may not be improved, in some cases.

According to the method of producing an organic particle dispersion of the present invention, it is possible to efficiently disperse organic particles in an organic particle dispersion prepared by a reprecipitation method, or aggregated organic particles in a concentrated liquid obtained by concentrating the dispersion. Further, it is also possible to produce organic particles and a dispersion containing the organic particles that can be suitably used for a color filter coating liquid or ink-jet ink, on an industrial scale.

EXAMPLES

The present invention will be described in more detail based on the following examples, but the present invention is not limited thereto.

Example 1

15 mmol/L of a pigment solution was prepared by dissolving a pigment (Pigment Red 254) in a solution prepared by mixing 1-methyl-2-pyrrolidone and 1 mol/L of aqueous solution of sodium hydroxide at a ratio of 6:1. Water was separately prepared as a poor solvent.

100 ml of the pigment solution was injected at a flow rate of 50 ml/min by using an NP-KX-500 large-volume nonpulsating pump manufactured by Nippon Fine Chemical into 1,000 ml of the water as the poor solvent whose temperature had been controlled to 1° C. and which had been stirred with a GK-0222-10 Ramond stirrer (trade name, manufactured by Astellas Pharma Inc. (the former Fujisawa Pharmaceutical Co., Ltd.)), at 500 rpm, whereby an organic pigment particle dispersion was prepared.

The particle diameter and degree of monodispersion of the thus-prepared organic particle dispersion were measured with a Nanotrac UPA-EX 150 manufactured by NIKKISO Co., Ltd. As a result, the liquid had a number average particle diameter of 31 nm and a degree of monodispersion of 1.40. The prepared organic pigment particle dispersion (having a pigment particle concentration of about 0.05 mass %) was added with 500 ml of 2-(1-methoxy)propylacetate, and the whole was stirred at 25° C. for 10 minutes at 500 rpm. After that, the resultant was left standing for 1 day, and pigment particles were extracted to a 2-(1-methoxy)propylacetate phase, whereby a concentrated extract liquid was obtained.

The concentrated extract liquid containing the extracted pigment particles was filtered by using an FP-010 filter manufactured by SUMITOMO ELECTRIC FINE POLYMER INC., whereby a paste-like concentrated pigment liquid [I] (having a pigment particle concentration of 30 mass %) was obtained.

An organic particle dispersion [I] having the following composition according to the present invention was prepared by using the above paste-like concentrated pigment liquid [I].

| | |
|---|---|
| Paste-like concentrated pigment liquid [I] | 21.3 g |
| Pigmentary dispersing agent A | 0.6 g |
| Methacrylic acid/benzyl methacrylate copolymer * | 15.8 g |
| 1-methoxy-2-propylacetate | 42.3 g |

* copolymerization molar ratio 28/72, weight average molecular weight: 30,000, 40 mass % 1-methoxy-2-propylacetate solution

[Chemical formula 11]

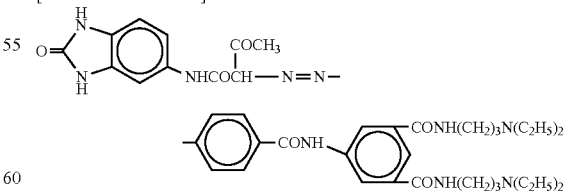

Pigmentary dispersing agent A

The organic particle dispersion [I] having the above composition was dispersed with a motor mill M-50 (manufactured by Igar), by using zirconia beads each having a diameter of 0.65 mm, at a circumferential speed of 9 m/s. Liquids prepared after stirring for 1 hour, 3 hours, 5 hours, 9 hours, and 15 hours were defined as Pigment Liquid Samples (1) to (5), respectively.

Film samples were produced for evaluating the performance of these pigment liquid samples. Each of Pigment Liquid Samples (1) to (5) obtained the above was applied to a glass substrate (75 mm×75 mm) with a Spin Coater 1H-D7 manufactured by MIKASA CO., LTD, and the resultant was dried with a hot plate at 100° C. for 2 minutes, whereby each of Film Samples (1) to (5) was produced.

Example 2

150 mmol/L of a pigment solution was prepared by dissolving a pigment (Pigment Red 254) in a solution prepared by mixing dimethyl sulfoxide and 8-mol/L aqueous solution of potassium hydroxide at a ratio of 6:1. Water was separately prepared as a poor solvent.

100 ml of the pigment solution was injected at a flow rate of 50 ml/min by using an NP-KX-500 large-volume nonpulsating pump manufactured by Nippon Fine Chemical into 1,000 ml of the water as the poor solvent whose temperature had been controlled to 1° C. and which had been stirred with a GK-0222-10 Ramond stirrer (trade name, manufactured by Astellas Pharma Inc. (the former Fujisawa Pharmaceutical Co., Ltd.)), at 500 rpm, whereby organic pigment particle dispersion was prepared.

The particle diameter and degree of monodispersion of the thus-prepared organic particle dispersion were measured with a Nanotrac UPA-EX 150 manufactured by NIKKISO Co., Ltd. As a result, the liquid had a number average particle diameter of 32 nm and a degree of monodispersion of 1.41.

The prepared organic pigment particle dispersion (having a pigment particle concentration of about 0.5 mass %) was added with 500 ml of 2-(1-methoxy)propylacetate, and the whole was stirred at 25° C. for 10 minutes at 500 rpm. After that, the resultant was left standing for 1 day, and pigment particles were extracted to a 2-(1-methoxy)propylacetate phase, whereby a concentrated extract liquid was obtained.

The concentrated extract liquid containing the extracted pigment particles was filtered by using an FP-010 filter manufactured by SUMITOMO ELECTRIC FINE POLYMER INC., whereby a paste-like concentrated pigment liquid [II] (having a pigment particle concentration of 35 mass %) was obtained.

| Paste-like concentrated pigment liquid [II] | 18.3 g |
| Pigmentary dispersing agent A | 0.6 g |
| Methacrylic acid/benzyl methacrylate copolymer * | 15.8 g |
| 1-methoxy-2-propylacetate | 45.3 g |

* copolymerization molar ratio 28/72, weight average molecular weight: 30,000, 40 mass % 1-methoxy-2-propylacetate solution Pigment Liquid Samples (6) to (10) were obtained from the organic particle dispersion [II] having the above composition according to the present invention, in the same manner as in Example 1. Film Samples (6) to (10) were each prepared from Pigment Liquid Samples (6) to (10) obtained in the same manner as in Example 1.

Example 3

Pigment Liquid Samples (11) to (15) were each prepared in the same manner as in Example 1 except that the methacrylic acid/benzyl methacrylate copolymer was changed to 15.8 g of a methacrylic acid/benzyl methacrylate/styrene copolymer (molar ratio 27:60:13, weight average molecular weight: 28,000, 40 mass % 1-methoxy-2-propylacetate solution).

Film Samples (11) to (15) were each prepared from Pigment Liquid Samples (11) to (15) obtained in the same manner as in Example 1.

Example 4

Pigment Liquid Samples (16) to (20) were each prepared in the same manner as in Example 1 except that the methacrylic acid/benzyl methacrylate copolymer was changed to 15.8 g of a methacrylic acid/propyl methacrylate/styrene copolymer (molar ratio 26:62:12, weight average molecular weight: 29,000, 40 mass % 1-methoxy-2-propylacetate solution).

Film Samples (16) to (20) were each prepared from Pigment Liquid Samples (16) to (20) obtained in the same manner as in Example 1.

Example 5

Pigment Liquid Samples (21) to (25) were each prepared in the same manner as in Example 1 except that the methacrylic acid/benzyl methacrylate copolymer was changed to 15.8 g of a methacrylic acid/methyl methacrylate/styrene copolymer (molar ratio 25:62:13, weight average molecular weight: 30,000, 40 mass % 1-methoxy-2-propylacetate solution).

Film Samples (21) to (25) were each prepared from Pigment Liquid Samples (21) to (25) obtained in the same manner as in Example 1.

Example 6

Pigment Liquid Samples (26) to (30) were each prepared in the same manner as in Example 1 except that the methacrylic acid/benzyl methacrylate copolymer was changed to 15.8 g of a polyacrylic acid (weight average molecular weight: 33,000, 40 mass % 1-methoxy-2-propylacetate solution).

Film Samples (26) to (30) were each prepared from Pigment Liquid Samples (26) to (30) obtained in the same manner as in Example 1.

Example 7

Pigment Liquid Samples (31) to (35) were each prepared in the same manner as in Example 1 except that the methacrylic acid/benzyl methacrylate copolymer was changed to 15.8 g of a polyvinyl sulfuric acid (weight average molecular weight: 32,000, 40 mass % 1-methoxy-2-propylacetate solution).

Film Samples (31) to (35) were each prepared from Pigment Liquid Samples (31) to (35) obtained in the same manner as in Example 1.

Example 8

Pigment Liquid Samples (26) to (30) were each prepared in the same manner as in Example 1 except that the methacrylic acid/benzyl methacrylate copolymer was changed to 15.8 g of a polyvinyl alcohol (weight average molecular weight: 31,000, 40 mass % 1-methoxy-2-propylacetate solution).

Film Samples (36) to (40) were each prepared from Pigment Liquid Samples (36) to (40) obtained in the same manner as in Example 1.

Example 9

Pigment Liquid Samples (41) to (45) were each prepared in the same manner as in Example 1 except that the pigmentary dispersing agent A was not added.

Film Samples (41) to (45) were each prepared from Pigment Liquid Samples (41) to (45) obtained in the same manner as in Example 1.

Example 10

Pigment Liquid Samples (46) to (50) were each prepared in the same manner as in Example 1 except that the methacrylic acid/benzyl methacrylate copolymer was changed to a methacrylic acid/benzyl methacrylate copolymer (copolymerization molar ratio 28/72, weight average molecular weight: 10,000, 40 mass % 1-methoxy-2-propylacetate solution).

Film Samples (46) to (50) were each prepared from Pigment Liquid Samples (46) to (50) obtained in the same manner as in Example 1.

Example 11

Pigment Liquid Samples (51) to (55) were each prepared in the same manner as in Example 1 except that the methacrylic acid/benzyl methacrylate copolymer was changed to a methacrylic acid/benzyl methacrylate copolymer (copolymerization molar ratio 28/72, weight average molecular weight: 4,000, 40 mass % 1-methoxy-2-propylacetate solution).

Film Samples (51) to (55) were each prepared from Pigment Liquid Samples (51) to (55) obtained in the same manner as in Example 1.

Comparative Example 1

Pigment Liquid Samples (56) to (60) were each prepared in the same manner as in Example 1 except that the paste-like concentrated pigment liquid [I] was changed to 6.4 g of Pigment Red 254 (powder sample) and the amount of 1-methoxy-2-propylacetate was changed to 57.2 g.

Film Samples (56) to (60) were each prepared from Pigment Liquid Samples (56) to (60) obtained in the same manner as in Example 1.

Comparative Example 2

Pigment Liquid Samples (61) to (65) were each prepared in the same manner as in Example 1 except that the methacrylic acid/benzyl methacrylate copolymer was not added.

The preparation of Film Samples (61) to (65) was attempted from Pigment Liquid Samples (61) to (65) obtained in the same manner as in Example 1, but each of these Samples was not formed layer. Therefore, Film Samples (61) to (65) were not obtained.

Comparative Example 3

Pigment Liquid Samples (66) to (70) were each prepared in the same manner as in Example 1 except that the methacrylic acid/benzyl methacrylate copolymer was changed to a methacrylic acid/benzyl methacrylate copolymer (copolymerization molar ratio 28/72, weight average molecular weight: 800, 40 mass % 1-methoxy-2-propylacetate solution).

Film Samples (66) to (70) were each prepared from Pigment Liquid Samples (66) to (70) obtained in the same manner as in Example 1.

The viscosity of each of Pigment Liquid Samples (1) to (70) was measured with an E type viscometer (VISCONIC-ELD, manufactured by TOKI SANGYO CO., LTD.). Tables 1 and 2 show the results.

[Table 1]

TABLE 1

| Sample No. | | Time period of dispersion (hour) | Viscosity (mPa·s) |
|---|---|---|---|
| Pigment Liquid Sample (1) | Example (1) | 1 | 28 |
| Pigment Liquid Sample (2) | (This | 3 | 28 |
| Pigment Liquid Sample (3) | invention) | 5 | 28 |
| Pigment Liquid Sample (4) | | 9 | 28 |
| Pigment Liquid Sample (5) | | 15 | 28 |
| Pigment Liquid Sample (6) | Example (2) | 1 | 29 |
| Pigment Liquid Sample (7) | (This | 3 | 29 |
| Pigment Liquid Sample (8) | invention) | 5 | 29 |
| Pigment Liquid Sample (9) | | 9 | 29 |
| Pigment Liquid Sample (10) | | 15 | 29 |
| Pigment Liquid Sample (11) | Example (3) | 1 | 30 |
| Pigment Liquid Sample (12) | (This | 3 | 30 |
| Pigment Liquid Sample (13) | invention) | 5 | 30 |
| Pigment Liquid Sample (14) | | 9 | 30 |
| Pigment Liquid Sample (15) | | 15 | 30 |
| Pigment Liquid Sample (16) | Example (4) | 1 | 26 |
| Pigment Liquid Sample (17) | (This | 3 | 26 |
| Pigment Liquid Sample (18) | invention) | 5 | 26 |
| Pigment Liquid Sample (19) | | 9 | 26 |
| Pigment Liquid Sample (20) | | 15 | 26 |
| Pigment Liquid Sample (21) | Example (5) | 1 | 27 |
| Pigment Liquid Sample (22) | (This | 3 | 27 |
| Pigment Liquid Sample (23) | invention) | 5 | 27 |
| Pigment Liquid Sample (24) | | 9 | 27 |
| Pigment Liquid Sample (25) | | 15 | 27 |
| Pigment Liquid Sample (26) | Example (6) | 1 | 31 |
| Pigment Liquid Sample (27) | (This | 3 | 31 |
| Pigment Liquid Sample (28) | invention) | 5 | 31 |
| Pigment Liquid Sample (29) | | 9 | 31 |
| Pigment Liquid Sample (30) | | 15 | 31 |
| Pigment Liquid Sample (31) | Example (7) | 1 | 35 |
| Pigment Liquid Sample (32) | (This | 3 | 35 |
| Pigment Liquid Sample (33) | invention) | 5 | 35 |
| Pigment Liquid Sample (34) | | 9 | 35 |
| Pigment Liquid Sample (35) | | 15 | 35 |

[Table 2]

TABLE 2

| Sample No. | | Time period of dispersion (hour) | Viscosity (mPa·s) |
|---|---|---|---|
| Pigment Liquid Sample (36) | Example (8) | 1 | 26 |
| Pigment Liquid Sample (37) | (This | 3 | 26 |
| Pigment Liquid Sample (38) | invention) | 5 | 26 |
| Pigment Liquid Sample (39) | | 9 | 26 |
| Pigment Liquid Sample (40) | | 15 | 26 |
| Pigment Liquid Sample (41) | Example (9) | 1 | 32 |
| Pigment Liquid Sample (42) | (This | 3 | 32 |
| Pigment Liquid Sample (43) | invention) | 5 | 32 |
| Pigment Liquid Sample (44) | | 9 | 32 |
| Pigment Liquid Sample (45) | | 15 | 32 |
| Pigment Liquid Sample (46) | Example (10) | 0.1 | 26 |
| Pigment Liquid Sample (47) | (This | 0.2 | 26 |
| Pigment Liquid Sample (48) | invention) | 0.3 | 26 |
| Pigment Liquid Sample (49) | | 0.5 | 26 |
| Pigment Liquid Sample (50) | | 1 | 26 |
| Pigment Liquid Sample (51) | Example (11) | 1 | 30 |
| Pigment Liquid Sample (52) | (This | 3 | 30 |
| Pigment Liquid Sample (53) | invention) | 5 | 30 |
| Pigment Liquid Sample (54) | | 9 | 30 |
| Pigment Liquid Sample (55) | | 15 | 30 |
| Pigment Liquid Sample (56) | Comparative | 1 | 26 |

TABLE 2-continued

| Sample No. | | Time period of dispersion (hour) | Viscosity (mPa · s) |
|---|---|---|---|
| Pigment Liquid Sample (57) | example (1) | 3 | 26 |
| Pigment Liquid Sample (58) | | 5 | 26 |
| Pigment Liquid Sample (59) | | 9 | 26 |
| Pigment Liquid Sample (60) | | 15 | 26 |
| Pigment Liquid Sample (61) | Comparative | 1 | 30 |
| Pigment Liquid Sample (62) | example (2) | 3 | 30 |
| Pigment Liquid Sample (63) | | 5 | 30 |
| Pigment Liquid Sample (64) | | 9 | 30 |
| Pigment Liquid Sample (65) | | 15 | 100 |
| Pigment Liquid Sample (66) | Comparative | 1 | 26 |
| Pigment Liquid Sample (67) | example (3) | 3 | 26 |
| Pigment Liquid Sample (68) | | 5 | 26 |
| Pigment Liquid Sample (69) | | 9 | 26 |
| Pigment Liquid Sample (70) | | 15 | 26 |

Test Example

Film Samples (1) to (70) were each observed with an optical microscope (at a magnification of 500). A portion measuring 175 μm by 130 μm was captured. The resultant image was divided into 1,220,000 pixels, and was evaluated for concentration variation on the basis of a coefficient of variation (=the standard deviation of a concentration/the average value for the concentration). In addition, light-scattering of each film sample was evaluated as an absorbance at 700 nm measured with an 8453 type spectrophotometer manufactured by Agilent. The absorbance of 0.02 or less is designated by ○, the absorbance of 0.02 to 0.05 is designated by Δ, and the absorbance of 0.05 or more is designated by x. Tables 3 and 4 show the results.

[Table 3]

TABLE 3

| Sample No. | | Time period of dispersion (hour) | Variation coefficient of concentration (%) | Absorbance at 700 nm |
|---|---|---|---|---|
| Film Sample (1) | Example (1) | 1 | 10 | ○ |
| Film Sample (2) | (This | 3 | 8 | ○ |
| Film Sample (3) | invention) | 5 | 7 | ○ |
| Film Sample (4) | | 9 | 7 | ○ |
| Film Sample (5) | | 15 | 7 | ○ |
| Film Sample (6) | Example (2) | 1 | 10 | ○ |
| Film Sample (7) | (This | 3 | 8 | ○ |
| Film Sample (8) | invention) | 5 | 7 | ○ |
| Film Sample (9) | | 9 | 7 | ○ |
| Film Sample (10) | | 15 | 7 | ○ |
| Film Sample (11) | Example (3) | 1 | 10 | ○ |
| Film Sample (12) | (This | 3 | 8 | ○ |
| Film Sample (13) | invention) | 5 | 7 | ○ |
| Film Sample (14) | | 9 | 7 | ○ |
| Film Sample (15) | | 15 | 7 | ○ |
| Film Sample (16) | Example (4) | 1 | 10 | ○ |
| Film Sample (17) | (This | 3 | 8 | ○ |
| Film Sample (18) | invention) | 5 | 7 | ○ |
| Film Sample (19) | | 9 | 7 | ○ |
| Film Sample (20) | | 15 | 7 | ○ |
| Film Sample (21) | Example (5) | 1 | 12 | ○ |
| Film Sample (22) | (This | 3 | 10 | ○ |
| Film Sample (23) | invention) | 5 | 9 | ○ |
| Film Sample (24) | | 9 | 7 | ○ |
| Film Sample (25) | | 15 | 7 | ○ |
| Film Sample (26) | Example (6) | 1 | 15 | ○ |
| Film Sample (27) | (This | 3 | 12 | ○ |
| Film Sample (28) | invention) | 5 | 10 | ○ |
| Film Sample (29) | | 9 | 8 | ○ |

TABLE 3-continued

| Sample No. | | Time period of dispersion (hour) | Variation coefficient of concentration (%) | Absorbance at 700 nm |
|---|---|---|---|---|
| Film Sample (30) | | 15 | 7 | ○ |
| Film Sample (31) | Example (7) | 1 | 17 | ○ |
| Film Sample (32) | (This | 3 | 13 | ○ |
| Film Sample (33) | invention) | 5 | 10 | ○ |
| Film Sample (34) | | 9 | 9 | ○ |
| Film Sample (35) | | 15 | 8 | ○ |

[Table 4]

TABLE 4

| Sample No. | | Time period of dispersion (hour) | Variation coefficient of concentration (%) | Absorbance at 700 nm |
|---|---|---|---|---|
| Film Sample (36) | Example (8) | 1 | 20 | Δ |
| Film Sample (37) | (This | 3 | 15 | ○ |
| Film Sample (38) | invention) | 5 | 11 | ○ |
| Film Sample (39) | | 9 | 9 | ○ |
| Film Sample (40) | | 15 | 9 | ○ |
| Film Sample (41) | Example (9) | 1 | 10 | ○ |
| Film Sample (42) | (This | 3 | 9 | ○ |
| Film Sample (43) | invention) | 5 | 7 | ○ |
| Film Sample (44) | | 9 | 7 | ○ |
| Film Sample (45) | | 15 | 7 | ○ |
| Film Sample (46) | Example (10) | 1 | 10 | ○ |
| Film Sample (47) | (This | 3 | 8 | ○ |
| Film Sample (48) | invention) | 5 | 7 | ○ |
| Film Sample (49) | | 9 | 7 | ○ |
| Film Sample (50) | | 15 | 7 | ○ |
| Film Sample (51) | Example (11) | 1 | 12 | ○ |
| Film Sample (52) | (This | 3 | 10 | ○ |
| Film Sample (53) | invention) | 5 | 8 | ○ |
| Film Sample (54) | | 9 | 7 | ○ |
| Film Sample (55) | | 15 | 7 | ○ |
| Film Sample (56) | Comparative | 1 | 30 | x |
| Film Sample (57) | example (1) | 3 | 28 | x |
| Film Sample (58) | | 5 | 25 | Δ |
| Film Sample (59) | | 9 | 11 | ○ |
| Film Sample (60) | | 15 | 10 | ○ |
| Film Sample (61)~(65) | Comparative example (2) | Film Sample cannot be prepared. | | |
| Film Sample (66) | Comparative | 1 | 25 | x |
| Film Sample (67) | example (3) | 3 | 22 | x |
| Film Sample (68) | | 5 | 18 | Δ |
| Film Sample (69) | | 9 | 15 | ○ |
| Film Sample (70) | | 15 | 12 | ○ |

The above results show that the method of producing an organic particle dispersion according to the present invention made it possible to obtain a dispersion which can be formed into a film having a uniform concentration than that provided by a conventional method. It is presumed that the pigment particles in the dispersion were finely dispersing to obtain the film having a uniform concentration.

Further, in the case of dispersion of pigments with various dispersing machines (such as a roll mill, a ball mill, and an attritor) as a conventional method of dispersing organic pigments, excessively fining is occurred with the result that the viscosity of the pigment is increased. Consequently, in some cases, there are arose the following problems: the pigments dispersion prepared can not be taken out of a dispersion machine, the dispersion can not be transferred through a pipeline, and further the dispersion is solidified into a gel form during its storage so that the liquid can not be handled any more. Therefore, it has been difficult to provide a pigments dispersion with which a film having a more uniform concentration than that provided by a conventional method.

On the other hand, the method of producing an organic particle dispersion according to the present invention makes it possible to gain organic particles in a state of fining and having an excellent flowability, better than a conventional process; and to provide a pigment dispersion which can be formed into a film having a more uniform concentration than that provided by the conventional process, because the viscosity of the pigment is not increased.

Further, the method according to the present invention was able to provide a film having a uniform concentration as equal as that provided by a conventional method within a time period half or less of that in the conventional method. This shows that the method according to the present invention made it possible to achieve greater efficiency.

Furthermore, it is also found that the method according to the present invention was able to achieve a further improvement in efficiency, when the polymer compound having a weight average molecular weight of 1,000 or more was a compound having a carboxyl group, especially, when the polymer compound was a copolymerized compound containing a repeating unit derived from at least one compound having a carboxyl group and a repeating unit derived from at least one compound having a carboxylate group, in particular, when the repeating unit derived from a compound having a carboxyl group was represented by formula (1), and the repeating unit derived from a compound having a carboxylate group was represented by formula (2).

The reagents used are specifically the followings:

| Reagent | Manufacturer |
| --- | --- |
| Pigment Red 254 (Irgaphore Red) | Ciba Specialty Chemicals company |
| 1-Methyl-2-pyrrolidone | Wako Pure Chemical Industries, Ltd. |
| 2-(1-Methoxy) propyl acetate | Wako Pure Chemical Industries, Ltd. |
| Dimethylsulfoxide | Wako Pure Chemical Industries, Ltd. |
| 1-mol/l Aqueous solution of sodium hydroxide | Wako Pure Chemical Industries, Ltd. |
| 8-mol/l Aqueous solution of potassium hydroxide | Wako Pure Chemical Industries, Ltd. |

INDUSTRIAL APPLICABILITY

According to the method of producing an organic-particle dispersion of the present invention, it is possible to obtain an organic particle dispersion with a particle density suitable for industrial utilization and having excellent in dispersing stability. The dispersion can be used in, for example, an excellent coating liquid for a color filter or an excellent ink for ink-jet. Further, according to the method of producing an organic particle dispersion of the present invention, it is possible to provide the organic particle dispersion prepared efficiently. Therefore, the method of producing an organic particle dispersion of the present invention is suitable for production on an industrial scale.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2005-136746 filed in Japan on May 9, 2005, and Patent Application No. 2005-213501 filed in Japan on Jul. 22, 2005, each of which is entirely herein incorporated by reference.

The invention claimed is:

1. A method of producing an organic pigment particle dispersion, for use in production of a color filter, which comprises:

dissolving an organic pigment comprising a diketopyrrolopyrrole compound into a good solvent to form a solution, mixing the solution with a poor solvent for the organic pigment, the poor solvent being compatible with the good solvent, to prepare a first aqueous dispersion in which organic pigment particles having a number average particle diameter of 1 μm or less are dispersed, concentrating the first aqueous dispersion by at least one of the following (a) to (d):

(a) adding an extraction solvent to the first aqueous dispersion to extract the organic pigment particles into an extraction solvent phase;

(b) filtering the first aqueous dispersion through a filter;

(c) sedimenting the organic pigment particles of the first aqueous dispersion by centrifugal separation; and (d) drying a solvent of the first aqueous dispersion under heat or reduced pressure; to form a concentrated liquid containing the organic pigment particles, wherein the concentrated liquid has a pigment concentration 100 to 1000 times higher than the pigment concentration in the first aqueous dispersion, and mixing the concentrated liquid with an organic medium and a polymer dispersant having a weight average molecular weight of 1,000 or more and having an acidic group, to form a second organic dispersion, suitable for a color filter coating liquid, which contains the organic medium and the organic pigment particles therein.

2. The method of producing an organic pigment particle dispersion according to claim 1, wherein the acidic group is a carboxyl group.

3. The method of producing an organic pigment particle dispersion according to claim 2, wherein the polymer dispersant having a carboxyl group is a copolymer containing at least one repeating unit (A) derived from a compound having a carboxyl group, and at least one repeating unit (B) derived from a compound having a carboxylate group.

4. The method of producing an organic pigment particle dispersion according to claim 3, wherein the repeating unit (A) derived from a compound having a carboxyl group is a repeating unit represented by formula (1), and the repeating unit (B) derived from a compound having a carboxylate group is a repeating unit represented by formula (2);

[Chemical formula 1]

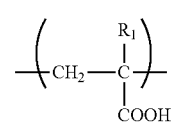

Formula (1)

wherein $R_1$ represents a hydrogen atom or an alkyl group having 1 to 5 carbon atoms;

[Chemical formula 2]

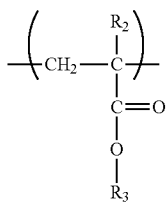

Formula (2)

wherein $R_2$ represents a hydrogen atom or an alkyl group having 1 to 5 carbon atoms, and $R_3$ represents a group represented by formula (3);

[Chemical formula 3]

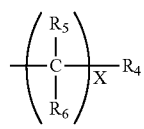

Formula (3)

wherein $R_4$ represents a hydrogen atom, an alkyl group having 1 to 5 carbon atoms, a hydroxy group, a hydroxyalkyl group having 1 to 5 carbon atoms, or an aryl group having 6 to 20 carbon atoms; $R_5$ and $R_6$ each represent a hydrogen atom or an alkyl group having 1 to 5 carbon atoms; and X represents an integer of 1 to 5.

5. The method of producing an organic pigment particle dispersion according to claim 4, wherein the repeating unit (A) derived from a compound having a carboxyl group is a repeating unit represented by formula (1), and the repeating unit (B) derived from a compound having a carboxylate group is a repeating unit represented by formula (4);

[Chemical formula 4]

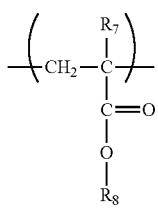

Formula (4)

wherein $R_7$ represents a hydrogen atom or an alkyl group having 1 to 5 carbon atoms, and $R_8$ represents a group represented by formula (5);

[Chemical formula 5]

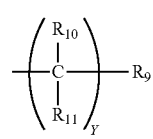

Formula (5)

wherein $R_9$ represents an alkyl group having 2 to 5 carbon atoms or an aryl group having 6 to 20 carbon atoms; $R_{10}$ and $R_{11}$ each represent a hydrogen atom or an alkyl group having 1 to 5 carbon atoms; and Y represents an integer of 1 to 5.

6. The method of producing an organic pigment particle dispersion according to claim 5, wherein the repeating unit (A) derived from a compound having a carboxyl group is a repeating unit derived from acrylic acid or methacrylic acid, and the repeating unit (B) derived from a compound having a carboxylate group is a repeating unit derived from a compound selected from the group consisting of benzyl acrylate, benzyl methacrylate, phenethyl acrylate, phenethyl methacrylate, 3-phenylpropyl acrylate, and 3-phenylpropyl methacrylate.

7. The method of producing an organic pigment particle dispersion according to claim 1, wherein the poor solvent for the organic pigment is a solvent selected from the group consisting of an aqueous solvent, an alcohol compound solvent, a ketone compound solvent, an ether compound solvent, an ester compound solvent, and a mixture of these solvents.

8. The method of producing an organic pigment particle dispersion according to claim 1, wherein the good solvent for the organic pigment is a solvent selected from the group consisting of an aqueous solvent, an alcohol compound solvent, a ketone compound solvent, an ether compound solvent, a sulfoxide compound solvent, an ester compound solvent, an amide compound solvent, and a mixture of these solvents.

9. The method of producing an organic pigment particle dispersion according to claim 1, wherein the organic pigment particle dispersion contains 60 mass% or more of an organic solvent.

10. The method of producing an organic pigment particle dispersion according to claim 1, wherein the step of concentrating the first aqueous dispersion comprises:

adding an extraction solvent to the first aqueous dispersion and mixing;

concentrating and extracting the organic pigment particles in an extraction solvent phase to obtain a concentrated extract; and filtering the concentrated extract through a filter to produce said concentrated liquid.

11. The method of producing an organic pigment particle dispersion according to claim 1, wherein the step of concentrating the first aqueous dispersion comprises sedimenting the organic pigment particles by centrifugal separation for concentration.

12. The method of producing an organic pigment particle dispersion according to claim 1, wherein the step of concentrating the first aqueous dispersion comprises drying a solvent under heat or reduced pressure for concentration.

13. The method of producing an organic pigment particle dispersion according to claim 1, wherein the concentration of organic pigment particles in the concentrated liquid is raised from 500 to 1,000 times as a result of concentrating the first aqueous dispersion.

\* \* \* \* \*